(12) United States Patent
Fry et al.

(10) Patent No.: US 10,898,871 B2
(45) Date of Patent: Jan. 26, 2021

(54) MICRO ELECTRICAL MECHANICAL SYSTEM (MEMS) MULTIPLEXING MIXING

(71) Applicant: INTERNATIONAL BUSINESS MACHINES CORPORATION, Armonk, NY (US)

(72) Inventors: Jonathan Fry, Fishkill, NY (US); Daniel Piper, Vancouver, WA (US); Jang Sim, Hopewell Junction, NY (US); Yongchun Xin, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 394 days.

(21) Appl. No.: 16/025,744

(22) Filed: Jul. 2, 2018

(65) Prior Publication Data

US 2020/0001257 A1    Jan. 2, 2020

(51) Int. Cl.
*B01F 13/00*      (2006.01)
*B01F 15/00*      (2006.01)
(Continued)

(52) U.S. Cl.
CPC ........ *B01F 13/0074* (2013.01); *B01F 5/0602* (2013.01); *B01F 5/10* (2013.01);
(Continued)

(58) Field of Classification Search
CPC .............. B01F 13/0061; B01F 13/0066; B01F 13/0072
(Continued)

(56) References Cited

U.S. PATENT DOCUMENTS

| 7,160,423 B2 * | 1/2007 | Chien ................. B01F 13/0076 |
| | | 204/451 |
| 7,374,332 B2 * | 5/2008 | Higashino ........... B01F 13/0062 |
| | | 137/602 |

(Continued)

FOREIGN PATENT DOCUMENTS

WO     2009066996 A1    5/2009

OTHER PUBLICATIONS

C. Szydzik et al., "Towards an integrated optofluidic system for highly sensitive detection of antibiotics in seawater incorporating bimodal waveguide photonic biosensors and complex, active microfluids", Proc. SPIE 10013, SPIE BioPhotonics Australasia, 2016, Adelaide, Australia (Dec. 9, 2016), all pages.

(Continued)

*Primary Examiner* — David L Sorkin
(74) *Attorney, Agent, or Firm* — Law Offices of Ira D. Blecker, P.C.

(57) ABSTRACT

A MEMS multiplexing system including: first and second fluid inputs; and a mixing network. The mixing network including: a first channel to receive the first fluid input; a second channel to receive the second fluid input; a multiplexing valve communicating with the first channel and the second channel, the multiplexing valve to cause the transport of the first fluid into the second channel so as to form a first interleaved fluid downstream from the multiplexing valve in the second channel and to cause the transport of the second fluid into the first channel so as to form a second interleaved fluid downstream from the multiplexing valve in the first channel; and the first channel and the second channel intersecting downstream from the valve so as to force mixing of the first interleaved fluid and the second interleaved fluid.

20 Claims, 10 Drawing Sheets

(51) Int. Cl.
*B01F 15/02* (2006.01)
*B01F 5/10* (2006.01)
*B01L 3/00* (2006.01)
*B01F 5/06* (2006.01)
*F16K 99/00* (2006.01)

(52) U.S. Cl.
CPC ........ *B01F 15/0022* (2013.01); *B01F 15/026* (2013.01); *B01F 15/0292* (2013.01); *B01L 3/502715* (2013.01); *B01L 2200/06* (2013.01); *B01L 2300/0627* (2013.01); *B01L 2300/0861* (2013.01); *F16K 99/0042* (2013.01); *F16K 2099/0084* (2013.01)

(58) Field of Classification Search
USPC ....................................................... 366/179.1

See application file for complete search history.

(56) References Cited

U.S. PATENT DOCUMENTS

| | | | |
|---|---|---|---|
| 7,842,248 B2 | 11/2010 | McAvoy et al. | |
| 8,226,908 B2 | 7/2012 | Zucchelli et al. | |
| 8,936,764 B2 | 1/2015 | Enzelberger et al. | |
| 9,152,150 B1* | 10/2015 | Lee ........................ | B01F 3/0811 |
| 9,555,408 B2 | 1/2017 | Tan et al. | |
| 9,579,650 B2 | 2/2017 | Hong et al. | |
| 2012/0309648 A1 | 12/2012 | Tseng et al. | |
| 2014/0104975 A1 | 4/2014 | Chivilikhin | |
| 2016/0115787 A1* | 4/2016 | Mostowfi ............ | B01F 13/0072 436/28 |
| 2017/0007998 A1 | 1/2017 | Fraden et al. | |

OTHER PUBLICATIONS

Prior Disclosure Submitted Under 35 USC 102(b)(1)(A): Micro Electrical Mechanical System (MEMS) Valve, Inventors:Jonathan Fry, Daniel Piper, Jang Sim, Yongchun Xin, U.S. Appl. No. 15/869,648, filed Jan. 12, 2018.

* cited by examiner

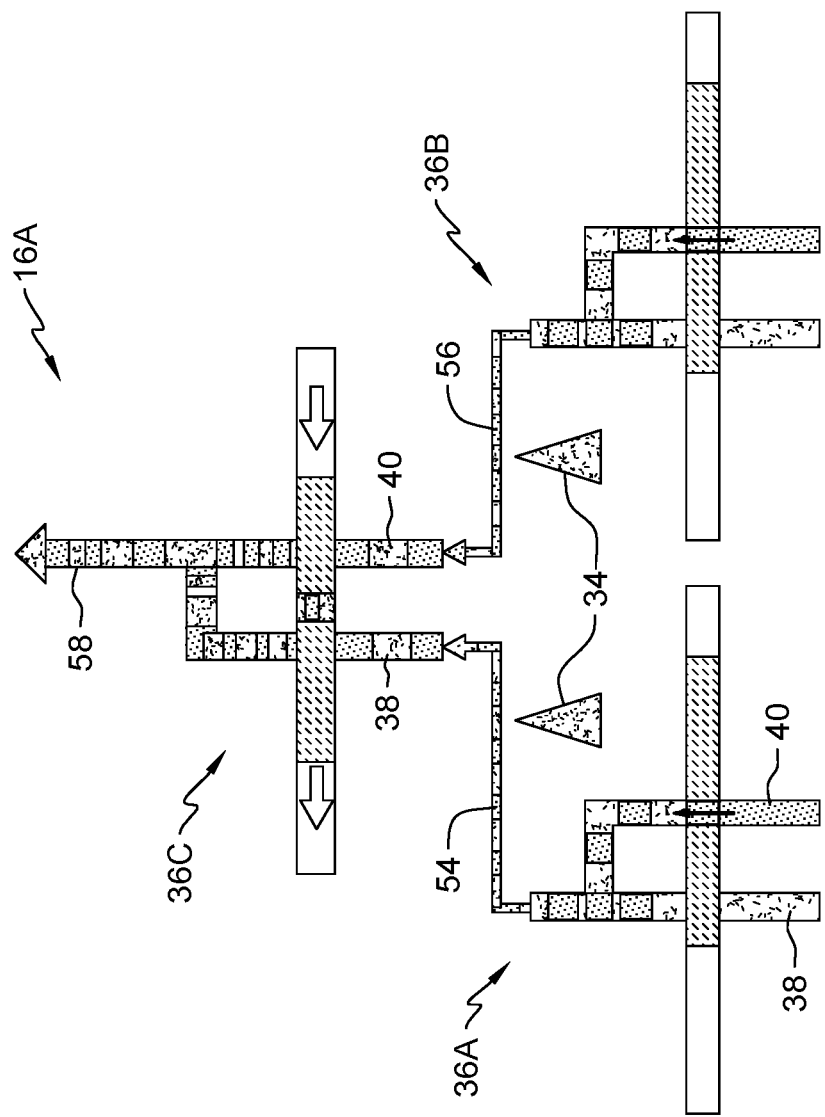
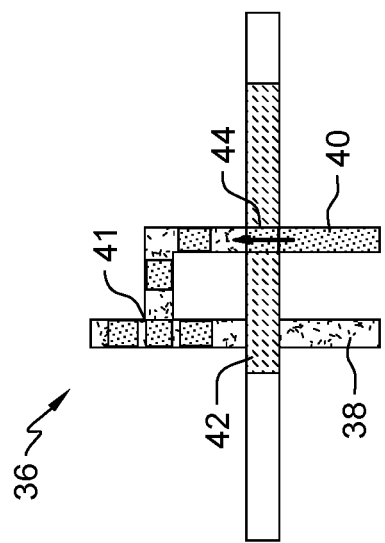
FIG. 3
FIG. 2

MICRO ELECTRICAL MECHANICAL SYSTEM (MEMS) MULTIPLEXING MIXING

BACKGROUND

The present exemplary embodiments pertain to systems and methods for mixing and dispensing a fluid and, more particularly, pertain to a micro electrical mechanical system (MEMS) for mixing and dispensing a fluid.

Micro electrical mechanical system (MEMS) is the technology of microscopic devices and is particularly concerned with devices having moving parts. In some cases, MEMS devices are used in the dispensation of chemicals especially where the dispensation is at the micro scale and the amounts of the chemicals need to be dispensed in exact amounts. In such cases, the MEMS devices need to be able to control a volume of each dispensed chemical and it is often required that this volumetric control system be robust and able to withstand motion and movement.

BRIEF SUMMARY

The various advantages and purposes of the exemplary embodiments as described above and hereafter are achieved by providing, according to an aspect of the exemplary embodiments, a micro electrical mechanical system (MEMS) multiplexing system comprising: a first fluid input in a mixing system; a second fluid input in the mixing system; a mixing network in the mixing system comprising: a first channel to receive the first fluid input; a second channel to receive the second fluid input; a multiplexing valve communicating with the first channel and the second channel, the multiplexing valve to cause the transport of the first fluid into the second channel so as to form a first interleaved fluid downstream from the multiplexing valve in the second channel and to cause the transport of the second fluid into the first channel so as to form a second interleaved fluid downstream from the multiplexing valve in the first channel; the first channel and the second channel intersecting downstream from the valve so as to force mixing of the first interleaved fluid and the second interleaved fluid to form a mixture of the first interleaved fluid and the second interleaved fluid; and an output channel to discharge the mixture of the first interleaved fluid and the second interleaved fluid.

According to another aspect of the exemplary embodiments, there is provided a micro electrical mechanical system (MEMS) multiplexing system comprising: a first fluid input; a second fluid input; a mixing network comprising: a first stage comprising at least first and second mixing nodes, each node comprising: a first channel to receive the first fluid input; a second channel to receive the second fluid input; a multiplexing valve communicating with the first channel and the second channel, the multiplexing valve to cause the transport of the first fluid into the second channel so as to form a first interleaved fluid downstream from the multiplexing valve in the second channel and to cause the transport of the second fluid into the first channel so as to form a second interleaved fluid downstream from the multiplexing valve in the first channel; the first channel and the second channel intersecting downstream from the multiplexing valve so as to force mixing of the first interleaved fluid and the second interleaved fluid so as to form a node mixture of the first interleaved fluid and the second interleaved fluid; and an output channel to output to a second stage the node mixture; a second stage comprising: a third channel to receive the node mixture from the first node; a fourth channel to receive the node mixture from the second node; a second stage multiplexing valve communicating with the third channel and the fourth channel, the second stage multiplexing valve to cause the transport of the first node mixture from the third channel into the fourth channel so as to form a third interleaved fluid downstream from the second stage multiplexing valve in the fourth channel and to cause the transport of the second node mixture from the fourth channel into the third channel so as to form a fourth interleaved fluid downstream from the second stage multiplexing valve in the first channel; and the third channel and the fourth channel intersecting downstream from the second stage multiplexing valve so as to force mixing of the third interleaved fluid and the fourth interleaved fluid to form a second stage mixture of the third interleaved fluid and the fourth interleaved fluid; and an output channel to discharge the second stage mixture.

According to a further aspect of the exemplary embodiments, there is provided a micro electrical mechanical system (MEMS) multiplexing mixing network comprising: a first channel having a first fluid; a second channel having a second fluid; a multiplexing valve communicating with the first channel and the second channel, the multiplexing valve to cause the transport of the first fluid into the second channel so as to form a first interleaved fluid downstream from the multiplexing valve in the second channel and to cause the transport of the second fluid into the first channel so as to form a second interleaved fluid downstream from the multiplexing valve in the first channel; the first channel and the second channel intersecting downstream from the valve so as to force mixing of the first interleaved fluid and the second interleaved fluid to form a mixture of the first interleaved fluid and the second interleaved fluid; and an output channel to discharge the mixture of the first interleaved fluid and the second interleaved fluid.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

FIG. 2 is an illustration of a node that forms a part of the mixing network.

FIG. 3 is an illustration of a multi-stage mixing network.

FIG. 9 is an illustration of the formation of the lower body of the node;

FIG. 10 is an illustration of the deposition of a self-release material in the lower body;

FIG. 11 is an illustration of the patterning of the self-release material;

FIG. 12 is an illustration of the deposition of a self-release etchant resistant material in the pattern formed in the self-release material;

FIG. 13 is an illustration of the formation of the body of the fluid multiplexer is formed on the self-release etchant resistant material;

FIG. 14 is an illustration of an additional layer of the self-release etchant resistant material formed on the body of the fluid multiplexer;

FIG. 15 is an illustration of additional deposition of self-release material and formation of the upper body of the node; and FIG. 16 is an illustration of the node after etching of the self-release material.

DETAILED DESCRIPTION

The small length scales and associated low fluid velocities inherent in the operation of microfluidic devices result in a low Reynolds number for fluid flows through the devices. That is, the fluid flows were often in the laminar regime. Fluids need to have high Reynolds number (higher meaning more chaotic) in order to mix. Because turbulent flow was not achieved, mixing was often poor, and the inhomogeneity of the fluids caused poor results or complicated the interpretation of data.

The problem of poor mixing is exacerbated when viscosities or chemical properties (for example, hydrophobic and hydrophilic) do not closely match.

Further problems with microfluidic devices include:

Exact control of mixing ratio is not possible with many systems

Mixing ratio is not adjustable on the fly

Mismatch of fluid properties can lead to stratification and lack of homogenization No integrated characterization of mixing or a feedback loop.

Accordingly, it is proposed to use a network of fluid multiplexers to mix one or more compounds to allow for recirculation and possible downstream additions of pure solution, modulate the duty cycle of the fluid multiplexers to modulate the percentage mix and control the homogeneity of the mix and provide characterization of the fluid as it propagates through the system to adjust system parameters on the fly and verify the desired mixture and homogeneity of the mixture.

Figure 1:
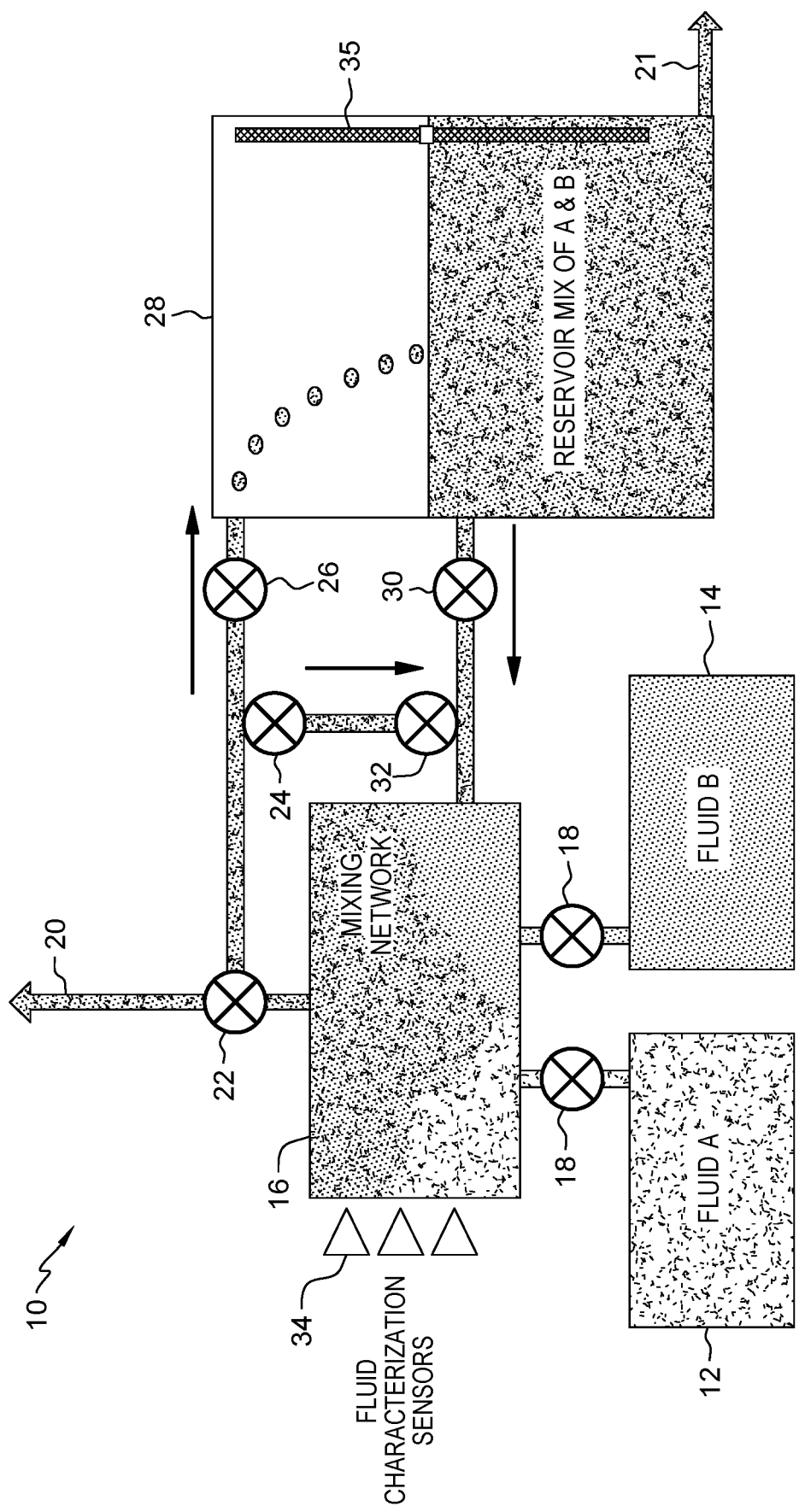
FIG. 1 is an illustration of a MEMS mixing system including a mixing network.

Referring to the Figures in more detail, and particularly referring to FIG. 1, there is illustrated an overview of a MEMS mixing system 10 according to one or more embodiments. Inputs to a mixing network 16 of the MEMS mixing system 10 include a Fluid A 12 and a Fluid B 14. There may be suitable valves 18 controlling the flow of Fluid A 12 and Fluid B to the mixing network. An output of the mixing network 16 is indicated at 20. The output 20 may supply a fluid mixture from the mixing network 16 to a desired use. A valve 22 may control the flow of fluid from the mixing network 16 to the output 20.

The mixing network 16 may additionally include various fluid characterization sensors 34 to monitor the composition of the fluid mixture in the mixing network and make any necessary adjustments on the fly to the composition of the fluid mixture. The fluid characterization sensors 34 may include, for example, refractive index sensors to determine composition of the mixture from optical properties of the mixture, mass flow sensors to indicate the viscosity of the mixture, pH sensors and electrical resistance sensors.

The MEMS mixing system 10 may additionally include one or more recirculation loops. One recirculation loop may allow fluid from the mixing network 16 to pass into a reservoir 28 and then back to the mixing network 16. In this case, the fluid path may need to pass through valves 22, 24, 26 into the reservoir 28 and then valves 30 and 32 back into the mixing network 16. In one or more embodiments, the reservoir 28 may have an outlet 21 to provide the fluid mixture from the reservoir 28 to a desired use. The reservoir may have a liquid level sensor 35 to measure the liquid level in the reservoir 28.

Alternatively, it may be desirable to remove the reservoir from the loop and instead shorten the loop by adding a shunt between valves 24 and 32. Such a shortened loop may be necessary or desirable in circumstances where the fluid mixture in the mixing network 16 may be adjusted before directing the fluid mixture to the reservoir 28.

Referring now to FIG. 2, there is illustrated one aspect of the mixing network 16. Node 36 is a basic building block of the mixing network 16 as it may be duplicated and added to in subsequent stages to make as complex mixing network 16 as is needed to meet the requirements of the fluid mixture.

The node 36 includes a first channel 38 to receive the input from Fluid A 12 and a second channel 40 to receive the input from Fluid B 14. The node 36 further includes a fluid multiplexer 42 which has properties of a valve and a selector resulting in an initial mixing by moving Fluid A 12 into the channel of Fluid B 14 and vice versa during a full cycle of the valve operation. The fluid multiplexer 42 meters the flow of Fluid A 12 and Fluid B into the node 36 as well as to transport fluid between the first channel 38 and the second channel 40.

Fluid multiplexer 42 has a perforation 44 that may permit the flow of Fluid A 12 when aligned with the first channel 38 and may permit the flow of Fluid B 14 when aligned with the second channel 40. The perforation 44 as shown in FIG. 2 is positioned so as to permit the flow of Fluid A 12 in first channel 38. In moving the fluid multiplexer 42 to the right from its present position, a portion of Fluid A 12, Fluid B 14 or a mix of Fluid A 12 and Fluid B 14 contained within perforation 44 may be transported into the second channel 40. Similarly, when perforation 44 is aligned with the second channel 40, with movement of the fluid multiplexer 42 to the left, a portion of the fluid contained within perforation 44, which may be Fluid A 12, Fluid B 14 or a mix of Fluid A 12 and Fluid B 14, may be transported to into the first channel 38.

The first channel 38 and the second channel 40 meet 41 at an acute angle (such that there is minimal back flow in to channel 38, and high enough angle to minimize laminar flow separation at the outlet of the node 36 downstream of the fluid multiplexer 42 which promotes mixing of Fluid A 12 and Fluid B 14. Preferably, the acute angle may be 60 to 80 degrees.

Figure 4A:
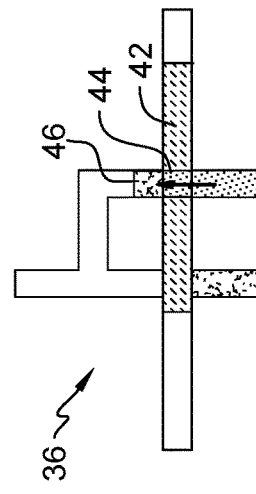
FIGS. 4A, 4B, 4C, 4D, 4E, 4F and 4G illustrate the operation of a node.

The operation of node 36 will be described in detail with respect to FIGS. 4A to 4G. In FIG. 4A, initially, there may or may not be a fluid in first channel 38 or second channel 40 downstream of the fluid multiplexer 42. The perforation 44 may capture a portion 46 of Fluid A 12 and transport this portion 46 to the right when the fluid multiplexer 42 moves to the right.

Figure 4B:
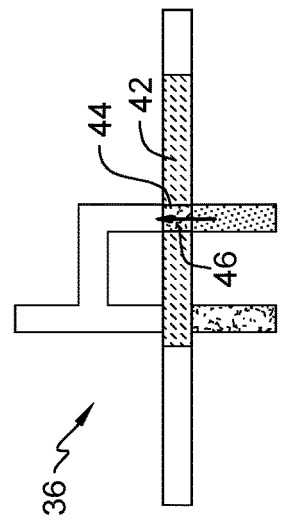
Figure 4F:
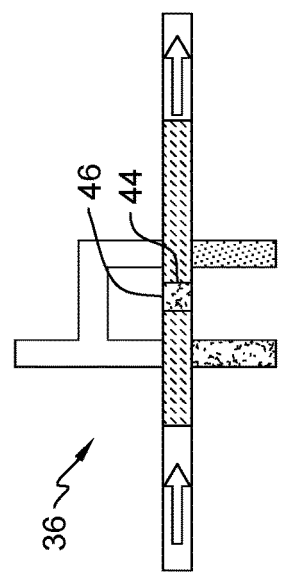
Figure 4C:
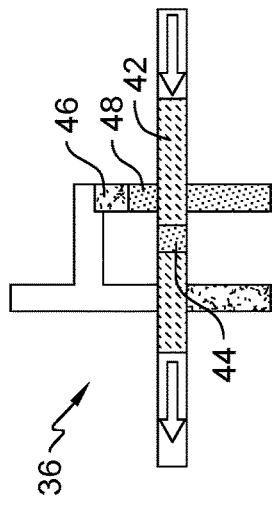

Referring now to FIG. 4B, the fluid multiplexer 42 has moved so that perforation 44 is aligned with the second channel 40. It is noted that portion 46 of Fluid A 12 has been transported into the second channel 40. The pressure from Fluid B 14 in the second channel 40 may force portion 46 of Fluid A 12 from the perforation 44 as illustrated in FIG. 4C.

Figure 4D:
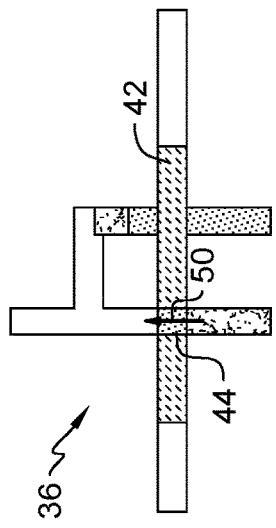

Fluid B 14 may now be allowed to flow through perforation 44 so that a portion 48 Fluid B 14 fills in behind portion 46 of Fluid A 12 and downstream of the fluid multiplexer 42. Subsequently, portion 50 of Fluid A 14 is captured within perforation 44 of fluid multiplexer 42 and is moved to the left as illustrated in FIG. 4D.

Figure 4E:
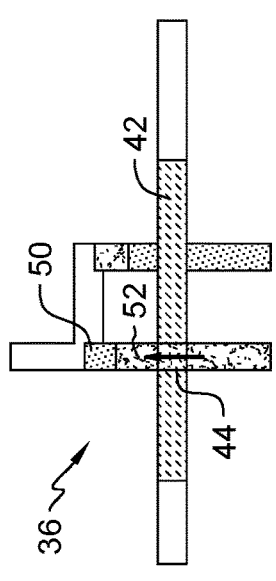

As illustrated in FIG. 4E, portion 50 has now been transported into the first channel 38 while the fluid multiplexer 42 blocks further flow into the second channel downstream of the fluid multiplexer 42. Fluid A 12 may now be allowed to flow through perforation 44 so that a portion 52 of Fluid A 12 fills in behind portion 50 of Fluid B 14 and downstream of the fluid multiplexer 42.

Figure 4G:
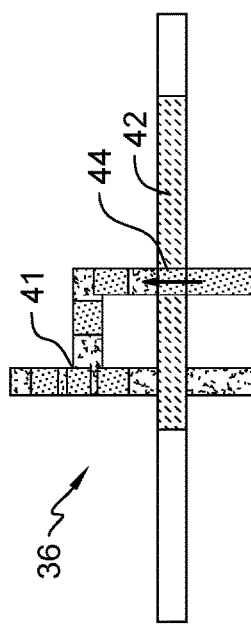

The fluid multiplexer 42 continues to move back and forth between the first channel 38 and the second channel 40 so as to transport portions of Fluid A 12 into the second channel 40 and portions of Fluid B 14 into the first channel 38. Fluid from the channel continues to fill in behind the transported portion so that portions of Fluid A 12 and Fluid B 14 become interleaved (alternated) within each of the first channel 30 and the second channel 40. The result is shown in FIG. 4G. When the first channel 38 and the second channel 40 become filled with respective portions of Fluid A 12 and Fluid B 14, the fluids are forced to mix at 41 where the first channel 38 and the second channel 40 meet. The angular relationship between the first channel 38 and the second channel 40 enhances the mixing that may occur when the two channels meet.

As noted previously, node 36 is a basic building block of the mixing network 16. In one or more embodiments, multiple nodes 36 may be combined to form a multi-stage mixing network 16A as illustrated in FIG. 3. The first stage of mixing network 16A may comprise node 36A and node 36B, each of which may process Fluid A 12 and Fluid B 14. In a second stage, the output 54 of node 36A may be utilized as an input to first channel 38 of node 36C and the output 56 of node 36B may be utilized as an input to second channel 40 of node 36C. Node 36C would in turn output at 58 a fluid mixture for use downstream.

Mixing network 16A may further include fluid characterization sensors 34 to monitor the outputs 54, 56 from nodes 36A, 36B, respectively. The compositions of the fluid mixtures flowing through each of node 36A and node 36B may be independently controlled. That is, in one or more embodiments, the proportions of Fluid A 12 and Fluid B 14 in node 36A may be different from the proportions of Fluid A 12 and Fluid B 14 in node 36B. The proportions of Fluid A 12 and Fluid B 14 may be regulated, for example, by modulating the duty cycle of the fluid multiplexers 42 in each of the nodes 36A, 36B. In one or more embodiments, Fluid A 12 and Fluid B 14 in node 36A may be different from Fluid A 12 and Fluid B 14 in node 36B.

An advantage of the multiple nodes 36 is that staged blending is possible. In staged blending, certain components are modified or blended first before other components are added so as to avoid any possible undesirable chemical reactions.

Figure 5:
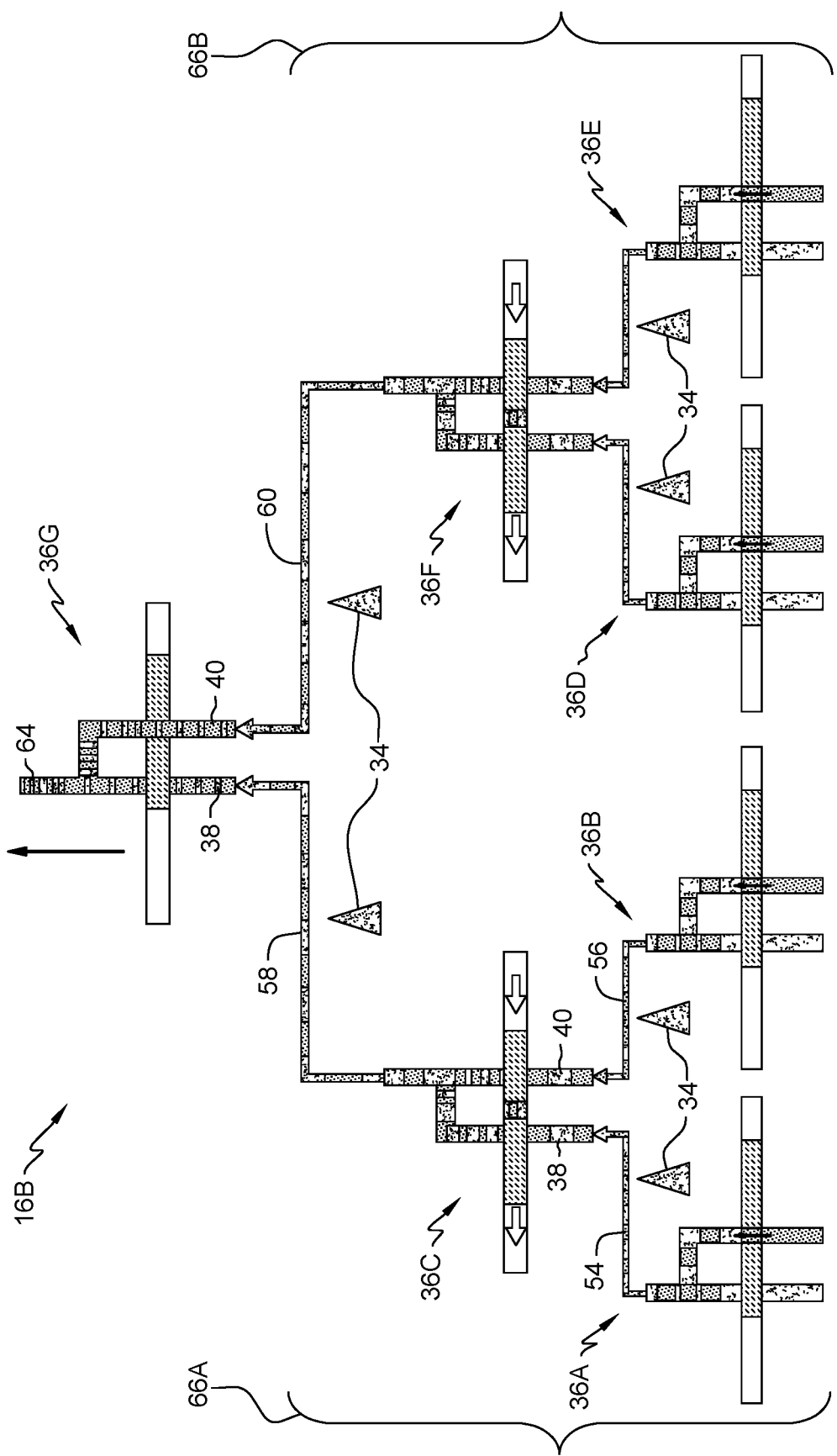
FIG. 5 is an illustration of another multi-stage mixing network.

Referring now to FIG. 5, in one or more embodiments, multiple nodes 36 may be combined to form another multi-stage mixing network 16B. Mixing network 16B is a three stage mixing network. Similar to mixing network 16A in FIG. 3, the first stage of mixing network 16B may comprise node 36A and node 36B, each of which may process Fluid A 12 and Fluid B 14. Again, the compositions of Fluid A 12 and Fluid B 14 in nodes 36A and 36B may be set independently of each other.

In a second stage, the output 54 of node 36A may be utilized as an input to first channel 38 of node 36C and the output 56 of node 36B may be utilized as an input to second channel 40 of node 36C. Node 36C would in turn output at 58 a fluid mixture for use downstream.

The first two stages of mixing network 16B may be referred to as a mixing unit. Mixing unit 66A contains the nodes 36A, 36B, 36C as described above. The mixing unit may be repeated a number of times to form a more complex mixing network. As shown in FIG. 5, there is an additional mixing unit 66B which may contain nodes 36D, 36E, 36F which may be the same in function as nodes 36A, 36B, 36C in mixing unit 66A. The fluid mulitplexers 42 may be modulated separately in each of the mixing units 66A, 66B to vary the composition of the fluid streams from each of the mixing units 66A, 66B.

The output 60 of mixing unit 66A may be utilized as an input to first channel 38 of node 36G and the output 62 of mixing unit 66B may be utilized as an input to second channel 40 of node 36G. Node 36G would in turn output at 64 a fluid mixture for use downstream.

Clear advantages of mixing network 16B in FIG. 5 over mixing network 16A in FIG. 3 are greater homogeneity of the final fluid mixture as well as the greater complexity of the mixing network which would allow greater compositional variety and control.

Mixing network 16B may further include fluid characterization sensors 34 to monitor the outputs 54, 56 from nodes 36A, 36B, respectively, and fluid characterization sensor 34 to monitor the output 60 from mixing unit 66A. Mixing unit 66B may have similar fluid characterization sensors 34.

Figure 6:
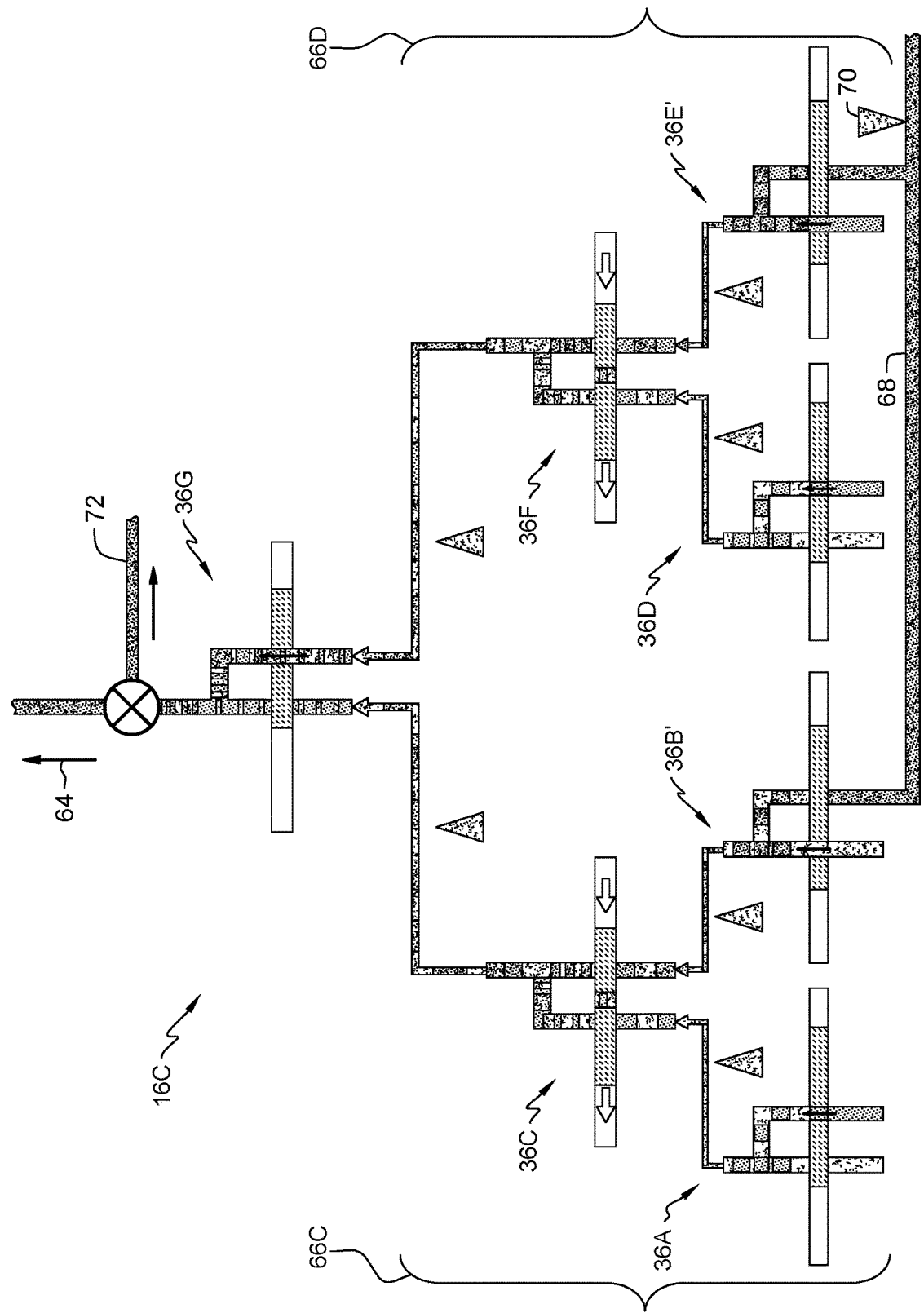
FIG. 6 is an illustration of a multi-stage mixing network having access to a reservoir.

In one or more embodiments, mixing network 16B has been modified by adding access to a reservoir. Mixing network 16C, illustrated in FIG. 6, includes channel 68 from a reservoir, not shown in FIG. 6, but may be reservoir 28 illustrated in FIG. 1, to a channel in node 36B' such as second channel 40 and/or to a channel in node 36E', such as first channel 38. There may also be a fluid characterization sensor 70 to monitor the composition of the fluid from the reservoir. The fluid characterization sensor 70 here may be, for example, a mass flow sensor. Node 36G, in addition to having outlet 64, may also have a return path 72 to the reservoir. The mixing network 16C may be advantageous to keep fluid in the reservoir adequately mixed if it were to remain unused for an extended period of time and also to possibly prevent separation of constituent components.

Figure 7:
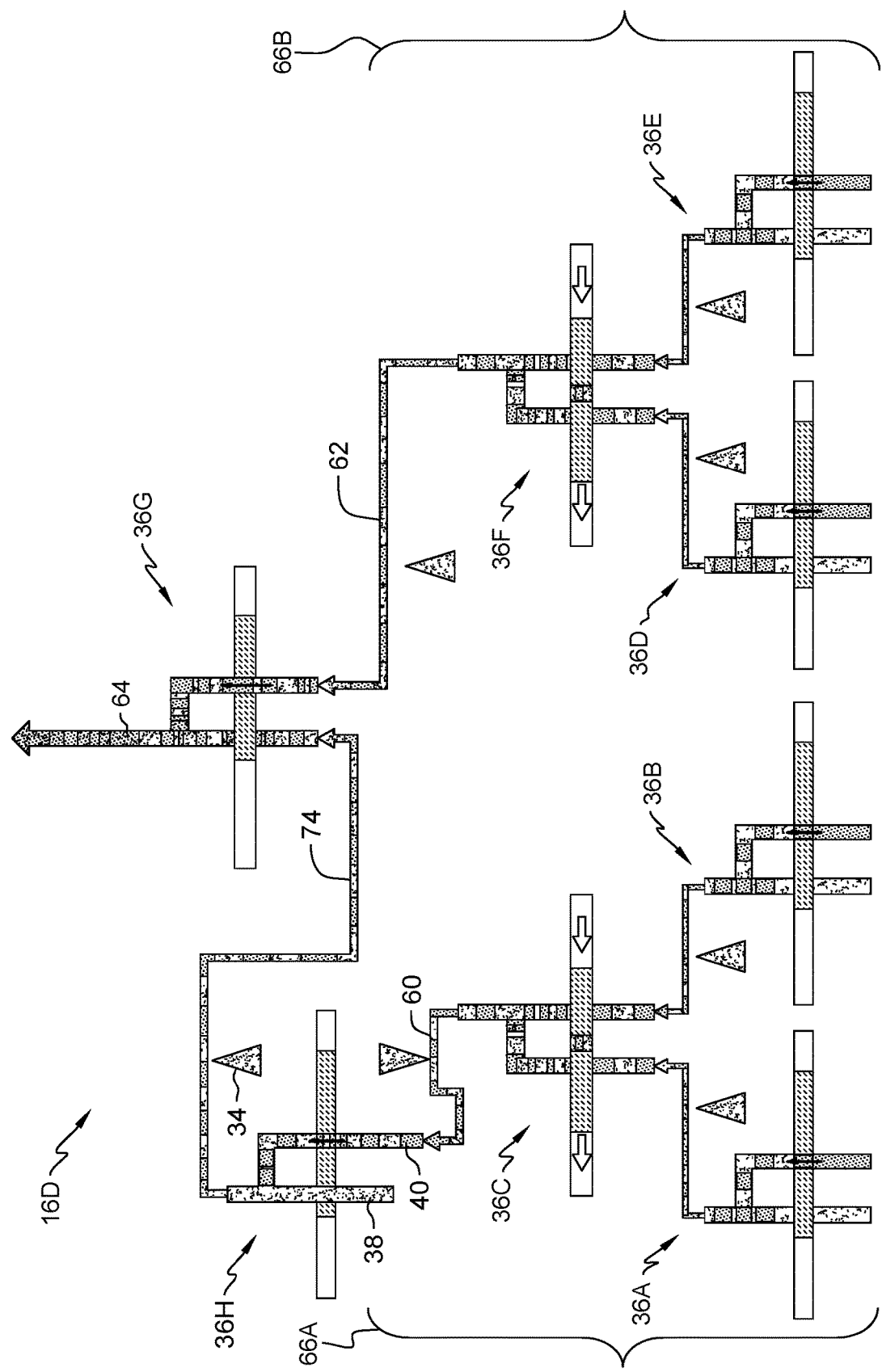
FIG. 7 is an illustration of a further multi-stage mixing network in which a different fluid may be added to the fluid mixture.

In one or more embodiments, mixing network 16B has been modified by adding another node to provide a different fluid to the fluid mixture. Mixing network 16D, illustrated in FIG. 7, includes an additional node 36H which may receive the output 60 from mixing unit 66A into the second channel 40 of node 36H. Node 36H is an intermediate stage between the first and second stages in mixing unit 66A and third stage 36G. The first channel 38 of node 36H may receive fresh Fluid A 12, or possibly even a different fluid such as a surfactant, and then output 74 this fluid mixture to the first channel 38 of node 36G. The second channel 40 of node 36G may receive the output 62 from mixing unit 66B as was the case with mixing network 16B.

Figure 8:
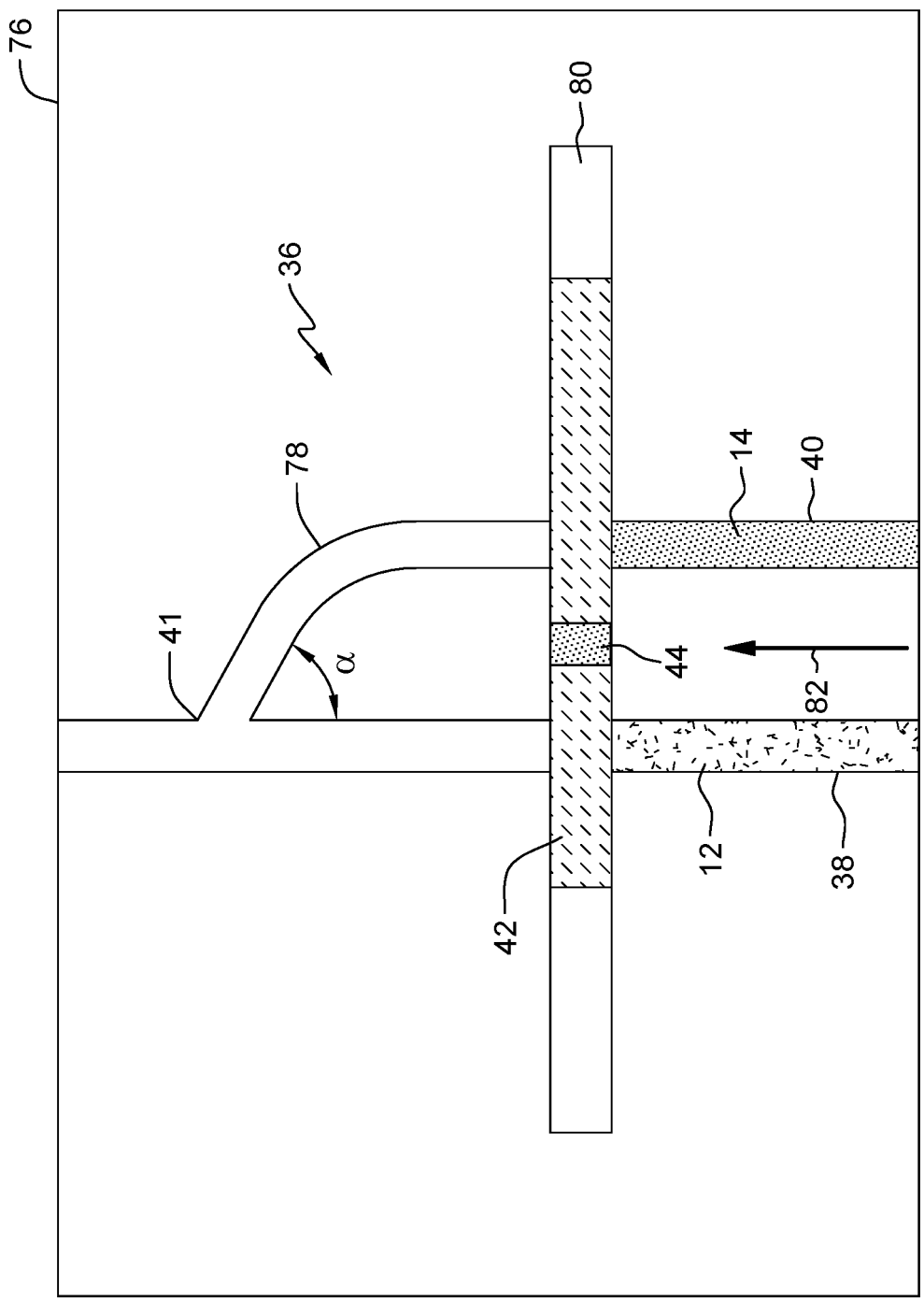
FIG. 8 is an illustration in greater detail of the node in FIG. 2.

FIG. 8 illustrates in greater detail the node 36 illustrated in FIG. 2. Node 36 has a body 76 in which are formed a first channel 38 and a second channel 40. Second channel 40 meets first channel 38 at 41. As illustrated in FIG. 2, the second channel 40 meets the first channel 38 at approximately 90 degrees. However, since the node 36 is made by a lithography process, described hereafter, corners are not favored and are usually replaced by curved surfaces 78 as illustrated in FIG. 8. Further, it is preferred that the first channel 38 and the second channel 40 meet at an acute angle $\alpha$. Most preferably, the acute angle should be 60 to 80 degrees.

Contained within channel 80 is fluid multiplexer 42 having an aperture 44. The fluid multiplexer 42 may be actuated by many methods such as electrostatics, fluid pressure or gas pressure (not shown) within channel 80 so that the aperture 44 may align with first channel 38 or second channel 40. As illustrated in FIG. 8, the fluid multiplexer is positioned so as to block the fluid flow of both the first channel 38 and the second channel 40. Fluid A 12 and Fluid B 14 are shown within first channel 38 and second channel 40, respectively. The direction of flow of Fluid A 12 and Fluid B 14 is indicated by allows 82.

Body 76 may be made from a material such as polymethymethacrylate (PMMA), polycarbonate (PC) or polyimide (PI). A surface coating of polydimethylsiloxane (PDMS) or another similar material may be applied to external surfaces of the body 76.

The process of forming the node 36 is illustrated in FIG. 9 to 16.

Figure 9:
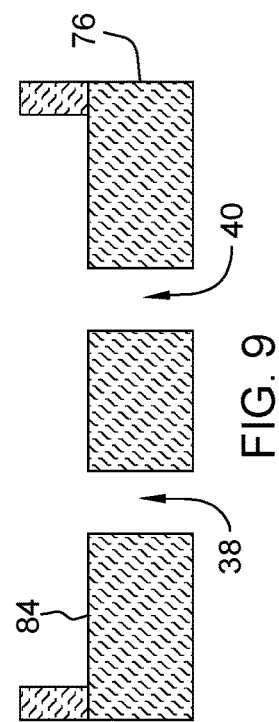
FIGS. 9 to 16 are illustrations of the process steps to form the node in FIG. 2 where.

As shown in FIG. 9, a lower of body 76 is formed, patterned and etched from photoresist material, which can be selected based on characteristic rigidity, thermal conductivity and a high melting point, to define an inlet to first channel 38 and second channel 40 and to define a lower portion 84 of channel 80.

Figure 10:
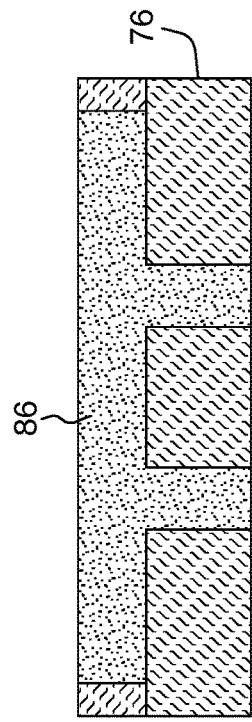
Figure 11:
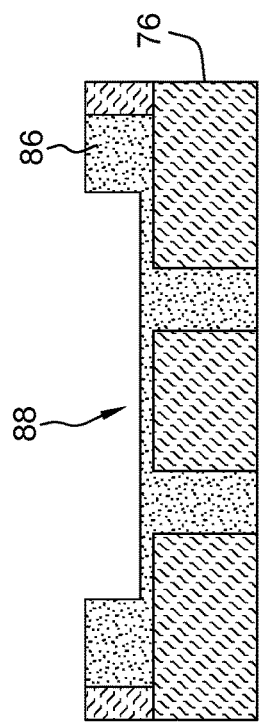

Next, as shown in FIG. 10, a self-release material 86 (or oxide) is deposited into the inlet portion of the first channel 30 and the second channel 40 and the lower portion 84 of the channel 80 and, as shown in FIG. 11, a recess 88 is patterned into the self-release material 86.

Figure 12:
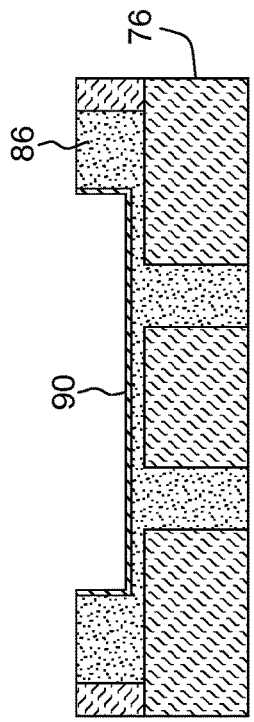
Figure 13:
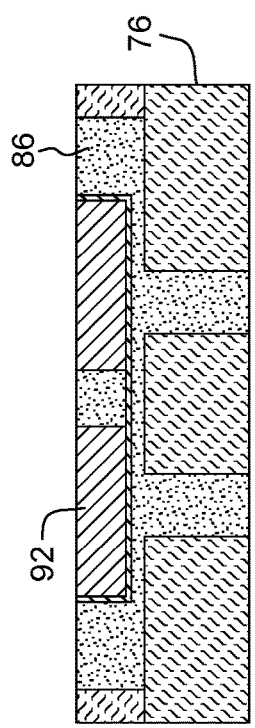
Figure 14:
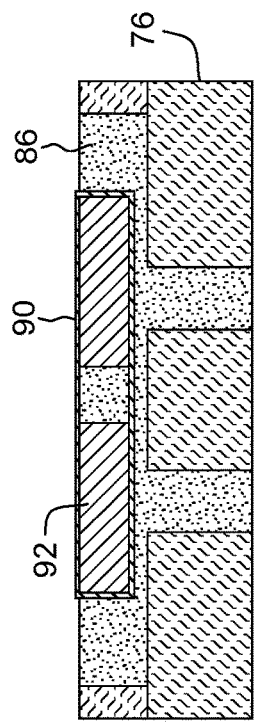

Once the recess 88 is patterned into the self-release material 86, self-release etchant resistant material 90 is deposited on the self-release material 86 in the recess 88 and on the uppermost surfaces of the self-release material 86 outside of the recess 88 and the lower portion 84 of the body 76. The deposited self-release etchant resistant material 90 is then etched or polished such that only the self-release etchant resistant material 90 in the recess 88 remains as shown in FIG. 12. At this point, the body 92 of fluid multiplexer 42 is formed on the self-release etchant resistant material 86 in the recess 88 as shown in FIG. 13 and an additional amount of the self-release etchant resistant material 90 is deposited on exposed surfaces of the body 92 as shown in FIG. 14.

In accordance with one or more embodiments, the forming of the fluid multiplexer body 92 may employ tolerance levels which are defined based on expected chamber pressures and inlet fluid pressures. The fluid multiplexer body 92 may be made from a material such as PECVD nitride or such material which will remain after the self-release etchant material is applied and etched away, The self-release material 86 may, for example, be used to fully encapsulate a low mass material such as xerogel which is an open network formed by the removal of all swelling agents from a gel and may be examples such as silica gel and dried out, compact, macromolecular structures, such as gelatin or rubber.

Figure 15:
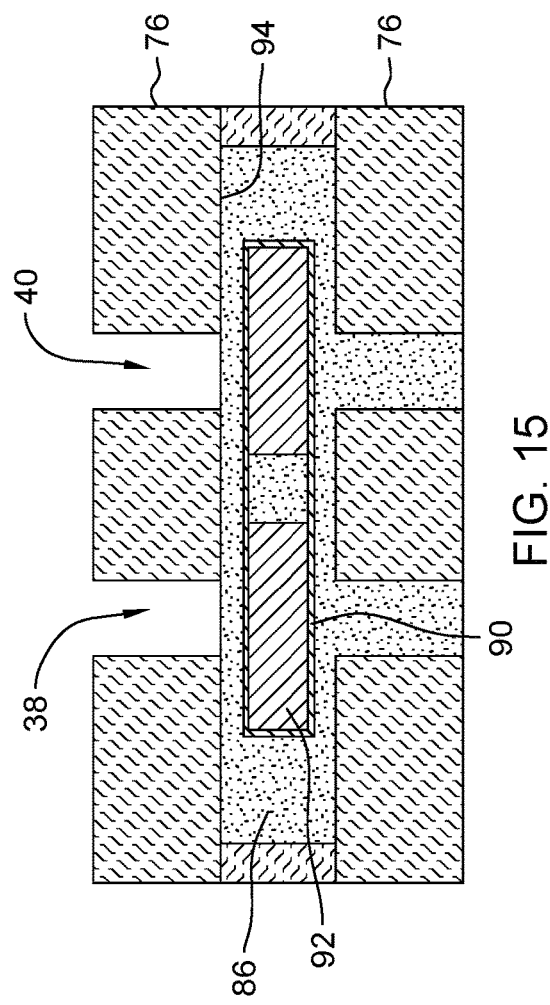
Figure 16:
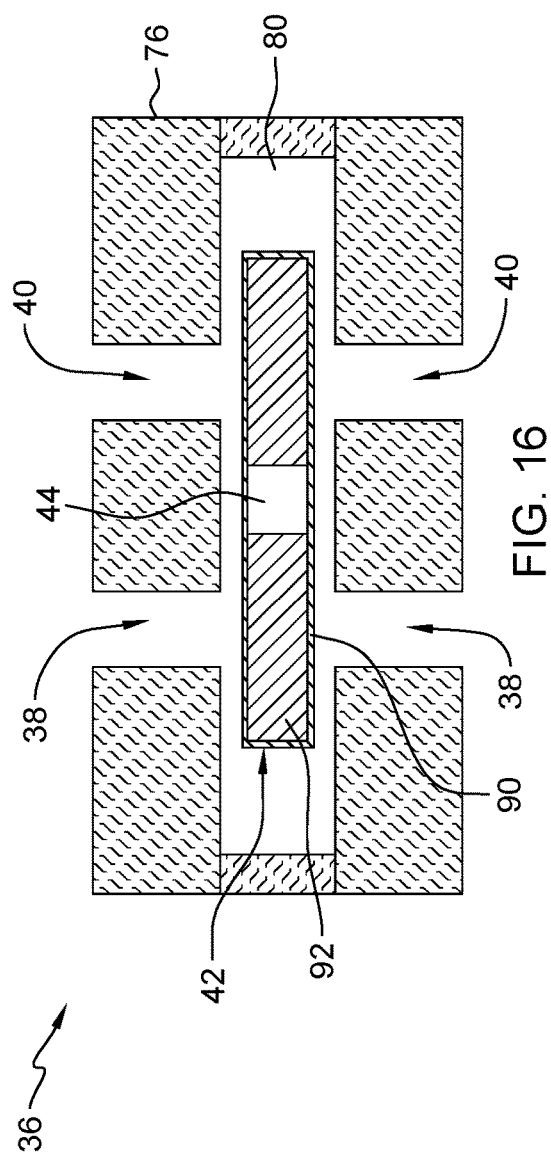
Figure 17:
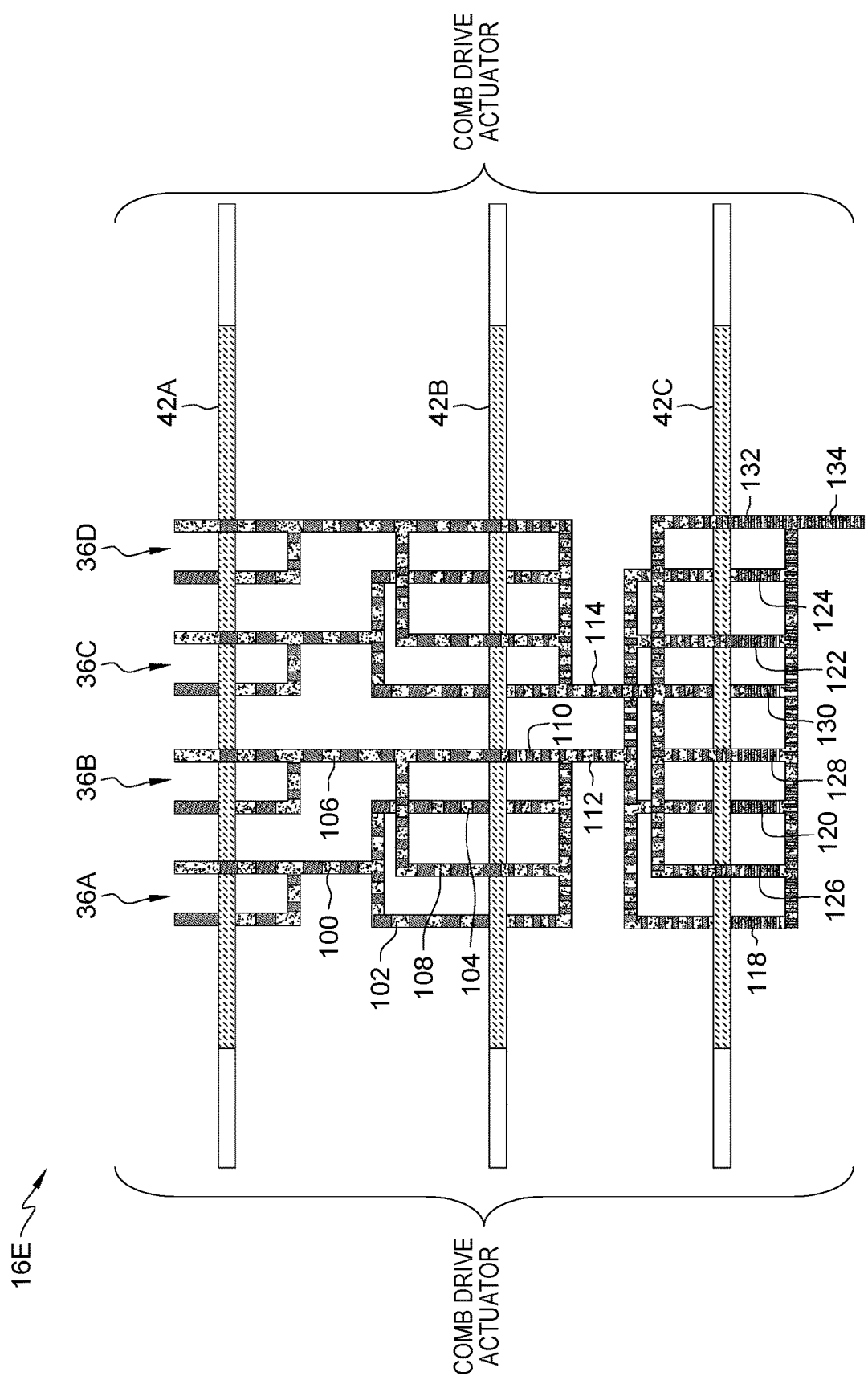
FIG. 17 is an illustration of a mixing network which has been ganged.

As shown in FIG. 15, an upper portion of the body 76 is formed to define outlet portions of the first channel 38 and the second channel 40 and to define an upper portion 94 of the channel 80. An additional amount of the self-release material 86 may be deposited to fill in the channel 80. At this point, as shown in FIG. 16, the self-release material 86 is etched to free the body 92 of fluid multiplexer 42.

For the sake of brevity, conventional techniques related to semiconductor device and integrated circuit (IC) fabrication can or cannot be described in detail herein. Moreover, the various tasks and process steps described herein can be incorporated into a more comprehensive procedure or process having additional steps or functionality not described in detail herein. In particular, various steps in the manufacture of semiconductor devices and semiconductor-based ICs are well known and so, in the interest of brevity, many conventional steps will only be mentioned briefly herein or will be omitted entirely without providing the well-known process details.

In general, the various processes used to form a microchip that will be packaged into an IC fall into four general categories, namely, film deposition, removal/etching, semiconductor doping and patterning/lithography. Deposition is any process that grows, coats, or otherwise transfers a material onto the wafer. Available technologies include physical vapor deposition (PVD), chemical vapor deposition (CVD), electrochemical deposition (ECD), molecular beam epitaxy (MBE) and more recently, atomic layer deposition (ALD) among others. Removal/etching is any process that removes material from the wafer. Examples include etch processes (either wet or dry), and chemical-mechanical planarization (CMP), and the like. Semiconductor doping is the modification of electrical properties by doping, for example, transistor sources and drains, generally by diffusion and/or by ion implantation. These doping processes are followed by furnace annealing or by rapid thermal annealing (RTA). Annealing serves to activate the implanted dopants. Films of both conductors (e.g., poly-silicon, aluminum, copper, etc.) and insulators (e.g., various forms of silicon dioxide, silicon nitride, etc.) are used to connect and isolate transistors and their components. Selective doping of various regions of the semiconductor substrate allows the conductivity of the substrate to be changed with the application of voltage. By creating structures of these various components, millions of transistors can be built and wired together to form the complex circuitry of a modern microelectronic device. Semiconductor lithography is the formation of three-dimensional relief images or patterns on the semiconductor substrate for subsequent transfer of the pattern to the substrate. In semiconductor lithography, the patterns are formed by a light sensitive polymer called a photo-resist. To build the complex structures that make up a transistor and the many wires that connect the millions of transistors of a circuit, lithography and etch pattern transfer steps are repeated multiple times. Each pattern being printed on the wafer is aligned to the previously formed patterns and slowly the conductors, insulators and selectively doped regions are built up to form the final device.

Referring now to 17, the mixing network 16E may be ganged to provide greater productivity of the fluid mixture. Nodes 36A, 36B, 36C, 36D may all be multiplexed by a single fluid multiplexer 42A.

The output 100 from node 36A is divided into inputs 102, 104 in a second stage of mixing network 16E. Similarly, the output 106 from node 36B is divided into inputs 108, 110 in a second stage of mixing network 16E. The output 112 of the second stage is used as an input to the third stage. Nodes 36C, 36D go through a similar process to result in output 114 which is also used as an input to the third stage. All of the nodes of the second stage may be multiplexed by a single fluid multiplexer 42B.

The outputs 112, 114 from the second stage are input to the third stage. Output 112 is divided into inputs 118, 120, 122, 124 while output 114 is divided into inputs 126, 128, 130, 132. The resulting output from the third stage is indicated by 134. All of the nodes of the third stage may be multiplexed by a single fluid multiplexer 42C.

The fluid multiplexers 42A, 42B, 42C may be driven by a comb actuator. The fluid multiplexers 42A, 42B, 42C may be driven in unison or separately so as to increase randomness of the fluid mixing.

In the foregoing embodiments, it is noted that the inputs to the nodes may appear to be symmetrical in dimension. It is not a requirement of the exemplary embodiments that the inputs to the nodes be symmetrical in dimension. It is within the scope of the exemplary embodiments for the inputs to the nodes to vary in cross sectional dimension within a node or nodes such that, for example, an input to a node for Fluid A 12 may be larger or smaller in cross sectional dimension than an input to the same node for Fluid B 12. As another example of varying the cross sectional dimensions of the inputs to the nodes, an input to a node for Fluid A 12 may be larger or smaller in cross sectional dimension than an input to a different node for Fluid B 12. An advantage to varying the cross sectional dimensions for the inputs to the nodes is that varying the cross sectional dimensions may result in varying mix ratios of the fluid mixture which makes the mixing networks of the exemplary embodiments adaptable to many mixing scenarios.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A micro electrical mechanical system (MEMS) multiplexing system comprising:
    a first fluid input in a mixing system;
    a second fluid input in the mixing system;
    a mixing network in the mixing system comprising:
        a first channel to receive the first fluid input;
        a second channel to receive the second fluid input;
        a multiplexing valve communicating with the first channel and the second channel, the multiplexing valve to cause the transport of the first fluid into the second channel so as to form a first interleaved fluid downstream from the multiplexing valve in the second channel and to cause the transport of the second fluid into the first channel so as to form a second interleaved fluid downstream from the multiplexing valve in the first channel;
        the first channel and the second channel intersecting downstream from the valve so as to force mixing of the first interleaved fluid and the second interleaved fluid to form a mixture of the first interleaved fluid and the second interleaved fluid; and
        an output channel to discharge the mixture of the first interleaved fluid and the second interleaved fluid.

2. The system of claim 1 wherein the first channel and second channel intersecting at an acute angle.

3. The system of claim 2 wherein the acute angle is 60 to 80 degrees.

4. The system of claim 1 further comprising an optical sensor in the mixing network to monitor the composition of the mixture of the first interleaved fluid and the second interleaved fluid.

5. The system of claim 1 further comprising a reservoir and wherein the output channel to output the mixture transports the mixture to the reservoir.

6. The system of claim 5 wherein the reservoir provides an input to at least one of the nodes.

7. A micro electrical mechanical system (MEMS) multiplexing system comprising:
    a first fluid input;
    a second fluid input;
    a mixing network comprising:
    a first stage comprising at least first and second mixing nodes, each node comprising:
        a first channel to receive the first fluid input;
        a second channel to receive the second fluid input;
        a multiplexing valve communicating with the first channel and the second channel, the multiplexing valve to cause the transport of the first fluid into the second channel so as to form a first interleaved fluid downstream from the multiplexing valve in the second channel and to cause the transport of the second fluid into the first channel so as to form a second interleaved fluid downstream from the multiplexing valve in the first channel;
        the first channel and the second channel intersecting downstream from the multiplexing valve so as to force mixing of the first interleaved fluid and the second interleaved fluid so as to form a node mixture of the first interleaved fluid and the second interleaved fluid;
        an output channel to discharge to a second stage the node mixture;
    a second stage comprising:
        a third channel to receive the node mixture from the first node;
        a fourth channel to receive the node mixture from the second node;
        a second stage multiplexing valve communicating with the third channel and the fourth channel, the second stage multiplexing valve to cause the transport of the first node mixture from the third channel into the fourth channel so as to form a third interleaved fluid downstream from the second stage multiplexing valve in the fourth channel and to cause the transport of the second node mixture from the fourth channel into the third channel so as to form a fourth interleaved fluid downstream from the second stage multiplexing valve in the first channel;
        the third channel and the fourth channel intersecting downstream from the second stage multiplexing valve so as to force mixing of the third interleaved fluid and the fourth interleaved fluid to form a second stage mixture of the third interleaved fluid and the fourth interleaved fluid; and
    an output channel to discharge the second stage mixture.

8. The system of claim 7 wherein the first channel and the second channel intersecting at a first acute angle and the third channel and the fourth channel intersecting at a second acute angle.

9. The system of claim 8 wherein the first acute and the second acute angle is 60 to 80 degrees.

10. The system of claim 7 further comprising optical sensors in the mixing network to monitor the composition of the node mixture and the composition of the second stage mixture.

11. The system of claim 7 wherein the first stage and the second stage form a mixing unit and wherein there are at least a first mixing unit and a second mixing unit and further comprising a third stage, the third stage comprising:
- a fifth channel to receive the second stage mixture from the first mixing unit;
- a sixth channel to receive the second stage mixture from the second mixing unit;
- a third stage multiplexing valve communicating with the fifth channel and the sixth channel, the third stage multiplexing valve to cause the transport of the second stage mixture from the fifth channel into the sixth channel so as to form a fifth interleaved fluid downstream from the third stage multiplexing valve in the sixth channel and to cause the transport of the second stage mixture from the sixth channel into the fifth channel so as to form a sixth interleaved fluid downstream from the third stage multiplexing valve in the fifth channel;
- the fifth channel and the sixth channel intersecting downstream from the third stage multiplexing valve so as to force mixing of the fifth interleaved fluid and the sixth interleaved fluid to form a third stage mixture of the fifth interleaved fluid and the sixth interleaved fluid; and
- an output channel to discharge the third stage mixture.

12. The system of claim 7 wherein the fifth channel and the sixth channel intersecting at a third acute angle.

13. The system of claim 12 wherein the third acute angle is 60 to 80 degrees.

14. The system of claim 7 further comprising a reservoir and wherein the output channel to output the second stage mixture transports the second stage mixture to the reservoir.

15. The system of claim 14 wherein the reservoir provides an input to at least one of the nodes.

16. The system of claim 11 further comprising an intermediate stage between the mixing unit and the third stage, the intermediate stage comprising a node to receive in the second channel of the node as an input the discharge from the mixing unit and providing fresh fluid as an input to the first channel of the node.

17. A micro electrical mechanical system (MEMS) multiplexing mixing network comprising:
- a first channel having a first fluid;
- a second channel having a second fluid;
- a multiplexing valve communicating with the first channel and the second channel, the multiplexing valve to cause the transport of the first fluid into the second channel so as to form a first interleaved fluid downstream from the multiplexing valve in the second channel and to cause the transport of the second fluid into the first channel so as to form a second interleaved fluid downstream from the multiplexing valve in the first channel;
- the first channel and the second channel intersecting downstream from the valve so as to force mixing of the first interleaved fluid and the second interleaved fluid to form a mixture of the first interleaved fluid and the second interleaved fluid; and
- an output channel to discharge the mixture of the first interleaved fluid and the second interleaved fluid.

18. The mixing network of claim 17 wherein the first channel and the second channel intersecting at an acute angle.

19. The mixing network of claim 18 wherein the acute angle is 60 to 80 degrees.

20. The mixing network of claim 17 further comprising an optical sensor in the mixing network to monitor the composition of the mixture of the first interleaved fluid and the second interleaved fluid.

\* \* \* \* \*